United States Patent [19]
Yamazaki

[11] Patent Number: 5,206,748
[45] Date of Patent: Apr. 27, 1993

[54] WIDE-FRAME ELECTRO-OPTIC DEVICE
[75] Inventor: Shunpei Yamazaki, Tokyo, Japan
[73] Assignee: Semiconductor Energy Laboratory Co., Ltd., Kanagawa, Japan
[21] Appl. No.: 673,813
[22] Filed: Mar. 22, 1991
[30] Foreign Application Priority Data
Mar. 27, 1990 [JP] Japan .................................. 2-77795
[51] Int. Cl.$^5$ ........................................ G02F 1/1343
[52] U.S. Cl. ........................................ 359/53; 359/88
[58] Field of Search ................ 350/336, 334, 333; 359/88, 80, 53

[56] References Cited
U.S. PATENT DOCUMENTS

| | | | |
|---|---|---|---|
| 3,846,015 | 11/1974 | Moi | 359/80 |
| 4,431,270 | 2/1984 | Funada et al. | 350/332 |
| 4,549,174 | 10/1985 | Funada et al. | 350/336 X |
| 4,702,566 | 10/1987 | Tukude | 350/336 X |
| 4,772,100 | 9/1988 | Suenaga | 359/88 X |
| 4,824,215 | 4/1989 | Joseph et al. | 359/88 X |
| 4,830,466 | 5/1989 | Matsuhashi et al. | 350/333 |
| 4,832,457 | 5/1989 | Saitoh et al. | 350/334 |
| 4,832,460 | 5/1989 | Fujimura et al. | 359/80 X |
| 5,106,197 | 4/1992 | Ohuchida et al. | 359/88 X |

FOREIGN PATENT DOCUMENTS

| | | |
|---|---|---|
| 56-121014 | 9/1981 | Japan . |
| 60-163018 | 8/1985 | Japan . |
| 63-271417 | 9/1988 | Japan . |

Primary Examiner—William L. Sikes
Assistant Examiner—Ron Trice
Attorney, Agent, or Firm—Sixbey, Friedman, Leedom & Ferguson

[57] ABSTRACT

A wide-frame display consisting of a plurality of constituent display cells is described. The display cell comprises a pair of substrates between which a light influencing layer is disposed. The light influencing layer changes its optical property in accordance with an electric field applied thereacross by means of an electrode arrangement. Driving signals are supplied to the electrode arrangement through holes opened in the substrate and receiving leads which make contact with the electrode arrangement at one end and extends from the external surface of the substrate for coupling with a driving circuit for supplying the driving signals.

23 Claims, 7 Drawing Sheets

WIDE-FRAME ELECTRO-OPTIC DEVICE

BACKGROUND OF THE INVENTION

1. Field of the Invention

The present invention relates to an electro-optic device. More particularly, it relates to such an electro-optic device having a wide display frame.

2. Description of the Prior Art

Recently, development of wide-frame displays has been in progress for use in the station yard, the external wall of a building or the like. The area of such displays reach several meters square.

A typical example of such display is constructed by combination of a number of constituent liquid crystal display cells arranged in a 10×15 matrix in order to form a very large display of 3 m height and 4.5 m width. Each cell has a frame of 50 dots×102 dots comprising picture elements arranged at 5.5 mm pitch in the horizontal scanning direction and at 2.5 mm pitch in the vertical direction. The entire display then has a frame of 512 dots×512 dots in the case of the color mode. The number of picture elements is virtually three-fold in the case of the white-black mode.

Figure 1:
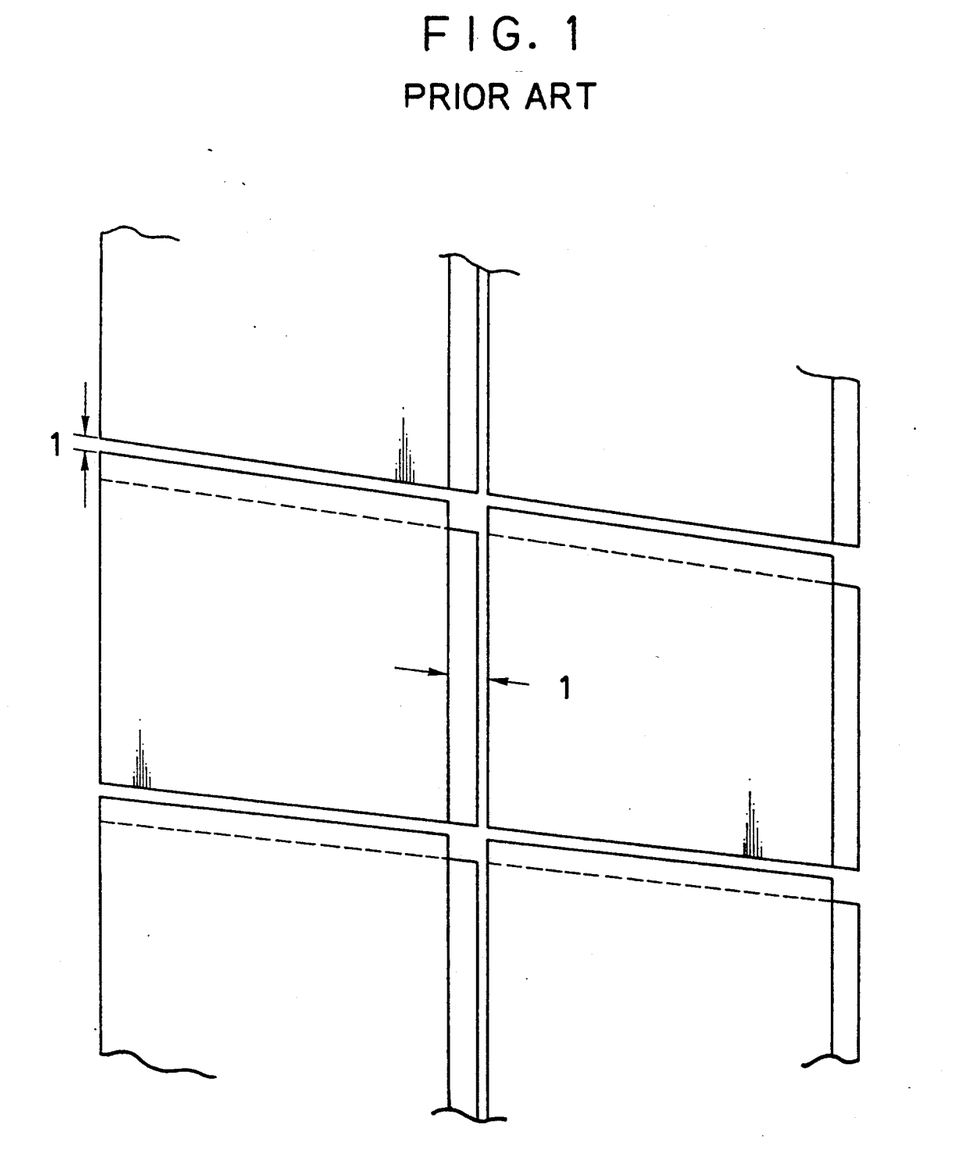
FIG. 1 is a perspective view showing a prior art electro-optic display having a wide display frame.
Figure 2:
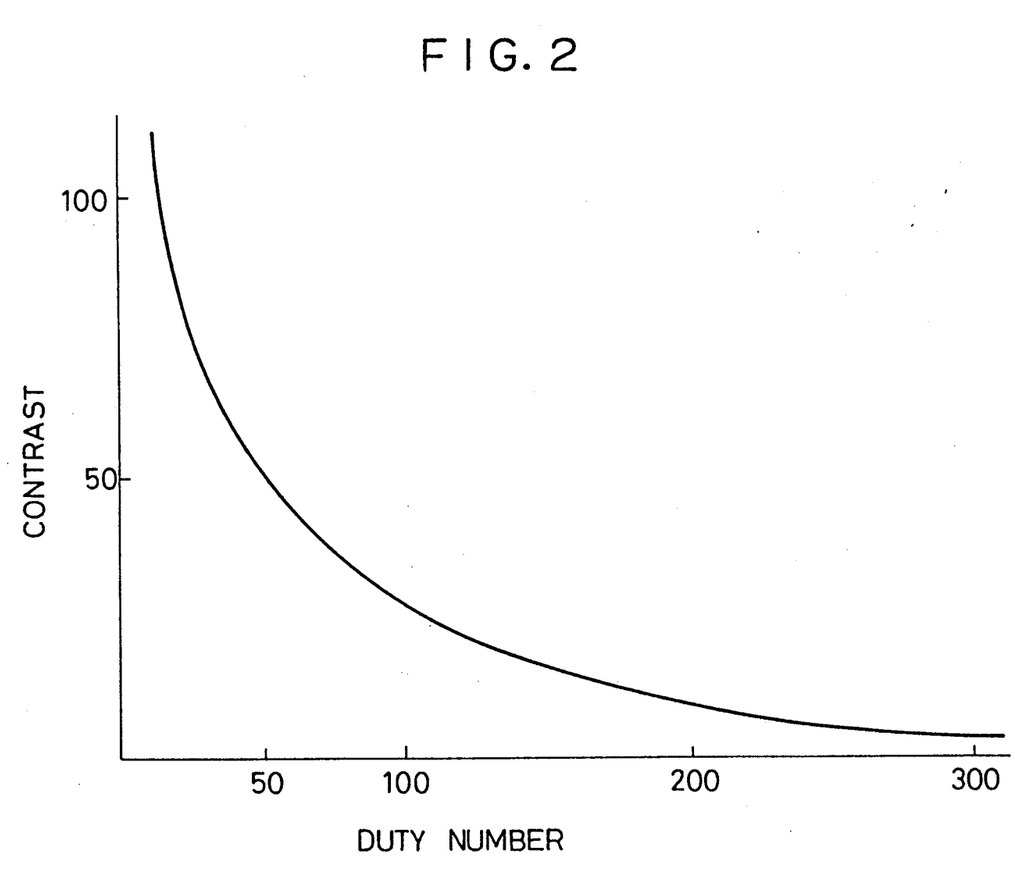
FIG. 2 is a graphical diagram showing the relationship between the duty number and the contrast.

There have been required in the conventional display, however, particular areas 1 of about 5 mm width between respective constituent cells for supplying driving signals to electrodes formed on the insides of the liquid crystal cells as illustrated in FIG. 1. Such dead areas 1 separate displayed images by applicable black lines. In addition, the contrast of images becomes substantially degraded as the duty number increases as shown in FIG. 2 in the cases of currently available liquid crystal displays utilizing twisted or super-twisted nematic liquid crystal materials. Furthermore, high driving voltage must be applied to the electrode patterns defining picture elements in wide-frame displays because the resistance of the pattern is increased in proportion to the area of the frame.

BRIEF SUMMARY OF THE INVENTION

It is an object of the present invention to provide an electro-optic device having a wide display frame.

It is another object of the present invention to provide an electro-optic device having a wide display frame in which no unsightly black line is applicable.

It is a further object of the present invention to provide an electro-optic device having a wide display frame which can be driven with small power consumption.

Additional objects, advantages and novel features of the present invention will be set forth in the description which follows, and in part will become apparent to those skilled in the art upon examination of the following or may be learned by practice of the present invention. The object and advantages of the invention may be realized and attained by means of the instrumentalities and combinations particularly pointed out in the appended claims.

To achieve the foregoing and other object, and in accordance with the present invention, as embodied and broadly described herein, driving signals are supplied to the electrode arrangement formed on the inside surface of a pair of substrates of an electro-optic device cell, between which a light influencing layer is disposed, by means of through-holes passing through one of the substrates. A plurality of leads are inserted into the holes. Each lead makes electrical contact with the electrode arrangement at one end and extends from the external surface of the substrate for making contact with a driving device at the other end for supplying control signals to the electrode arrangement.

By this construction, only holes and ends of the leads appear at the inside surface of the substrate in the electro-optic device cell so that, when a plurality of cells are assembled in a multi-cell device having a large displaying frame, there is no applicable black lines between adjacent cells, providing a good image quality.

BRIEF DESCRIPTION OF THE DRAWINGS

The accompanying drawings, which are incorporated in and form a part of the invention and, together with the description, serve to explain the principles of the invention.

DETAILED DESCRIPTION OF THE PREFERRED EMBODIMENTS

Figure 3A:
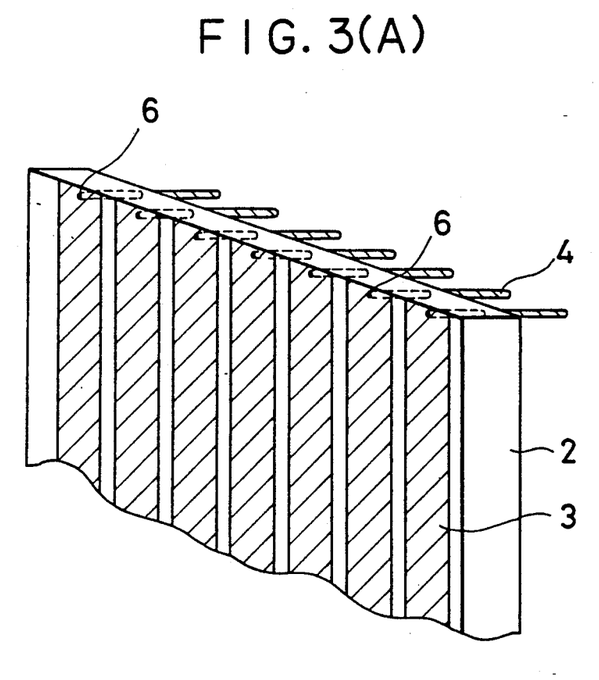
FIGS. 3(A) and 3(B) are partial perspective and side views for explaining the general concept of the electro-optic device having a wide display frame in accordance with the present invention.
Figure 3B:
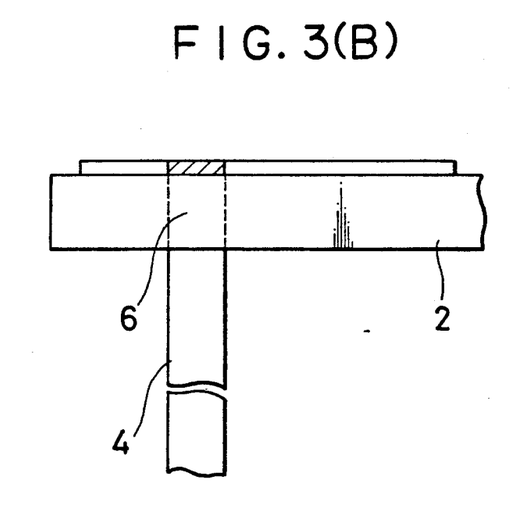

Referring now to FIGS. 3(A) and 3(B), the general concept of the present invention will be explained. One of a pair of substrates of a liquid crystal device (display) comprises a substrate 2 provided with an electrode pattern consisting of parallel conductive electrodes 3 on its inside surface as shown in FIG. 3(A). The electrodes terminate in through-holes 6 respectively at one edge of the inside surface of the substrate 2. Leads 4 made of Cu are inserted in the holes 6 of 0.3 mm diameter to make electrical contact with the respective electrodes 6 at one ends thereof. The thickness of the leads is as small as 0.3 mm corresponding to the diameter of the holes 6. The other ends of the leads are projected to the external side of the substrate to be connected with an external driving circuit for supplying driving signals to the electrodes. Accordingly, there is no necessity to sacrifice the plan area of the substrate for electrical connection with the driving circuit so that there is substantially no dead area in the plane of the frame. In practice, the dead area between two adjacent cells for joining them to construct a multi-cell device (display) can be limited as small as 1 mm or less. Of course, two or more slender leads, if appropriate, can be used instead of the single lead 4 for connection of one electrode. Hereinbelow, several embodiments are explained in conjunction with figures. Throughout the description, data signals indicative of images to be displayed are supplied to vertical electrodes and addressing signals are supplied to horizontal electrodes for scanning.

Referring now to FIGS. 4(A) to 4(E), an electro-optic device (display) in accordance with a first embodiment of the present invention will be explained. The device (display) is suitable for use as a constituent cell of a multi-cell device (display) having a wide-frame.

The device (display) comprises a pair of glass substrates 5 and 8. Each substrate is formed with a set of parallel electrodes 7 of 2.9 mm width with spacings of 0.1 mm therebetween on the inside thereof in a vertical relationship with the set of the other as shown in the figures. The electrodes 7 are formed of indium tin oxide (ITO) by sputtering with a metal mask. The number of the electrodes of each set is 81. Necessary orientation films given rubbing treatment and spacers 9 are provided on the inside of the substrate 5 and 8. A liquid crystal material is disposed between the substrates as a light influencing medium. The loss of the liquid crystal material is prevented by a sealing member 6a provided on the periphery of the substrates.

Figure 4A:
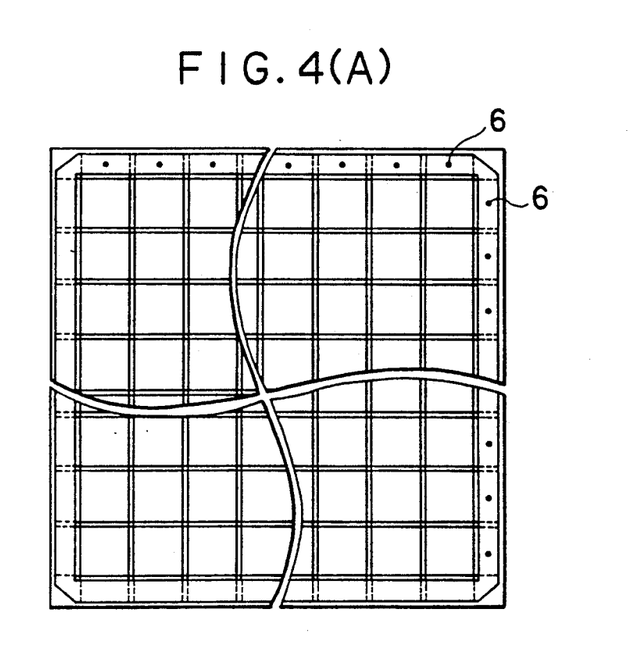
FIGS. 4(A) to 4(E) are partial perspective, side and plan views showing an electro-optic device having a wide display frame in accordance with a first embodiment of the present invention.
Figure 4B:
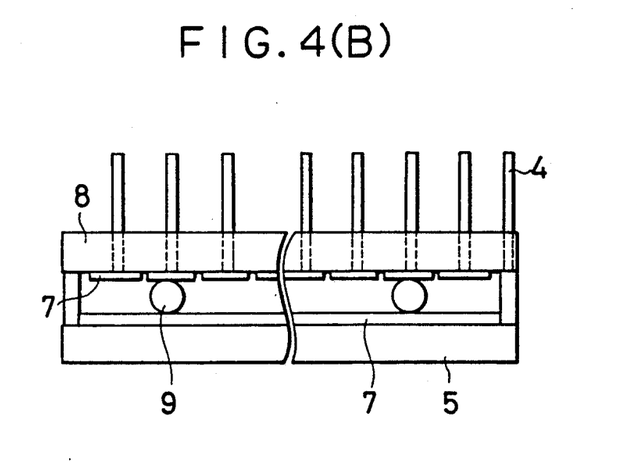
Figure 4C:
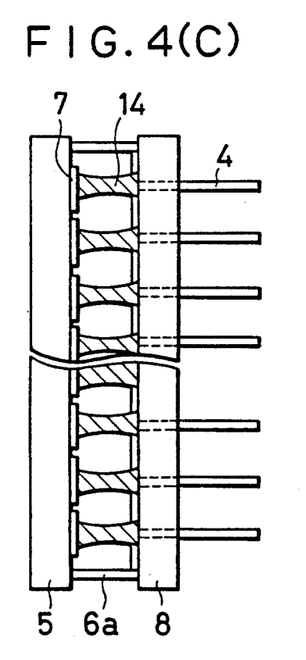
Figure 4D:
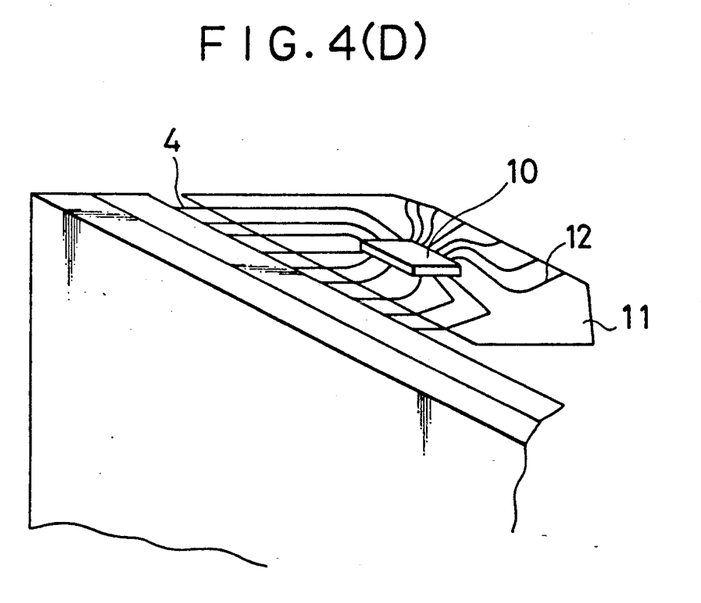
Figure 4E:
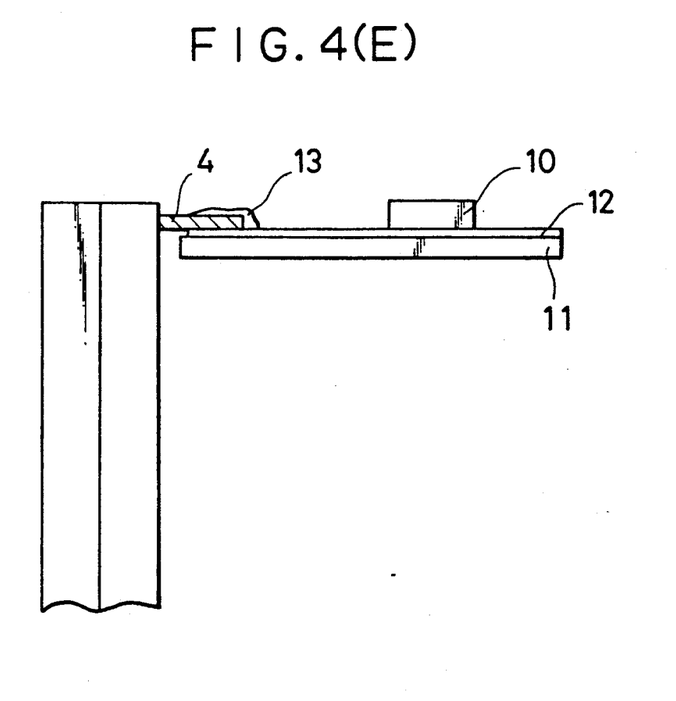

The vertical electrodes 7 terminate respectively in 0.3 mm diameter through-holes 6 which are formed in the substrate 8 near the upper end of the substrate 8 where the sealing member 6a is provided. Cu leads 4 of 0.3 mm thickness are inserted in the holes 6 which are horizontally arranged as shown in FIG. 4(B) in order to make electrical contact with the vertical electrodes 6 at one ends thereof. The other ends of the leads 4 are projected to the external side of the substrate to be connected with an external driving circuit for supplying driving signals to the electrodes. The driving circuit comprises an IC chip 10 mounted on and electrically connected with a conductive pattern 12 formed from a 0.1 mm thick Cu leaf on a 0.3 mm thick polyimide film 11. The coupling of the pattern 12 and the respective leads 4 is made by a TAB method with a solder 13 as shown in FIG. 4(E).

The horizontal electrodes 7 also terminate respectively in through-holes 6 which are formed in the substrate 8 near the right side end of the substrate 8 where the sealing member 6a is provided. Leads 4 are inserted in the holes 6 which are vertically arranged as shown in FIG. 4(C) in order to make electrical contact with the horizontal electrodes 7 at one ends thereof through connections 14 made of a silver paste coated on the sealing member 6a. The other ends of the leads are projected from the external side of the substrate to make contact with an external driving circuit for supplying driving signals to the electrodes. The coupling of the leads 4 and the driving circuit is made as shown in FIG. 4(D) in the same manner as explained above.

When a multi-cell device (display) is assembled by arranging 150 display cells manufactured by the above procedure in a matrix of vertically arranged 10 cells×horizontally arranged 15 cells, there are dead areas of only 1 mm width between adjacent cells corresponding to the thickness of the sealing member 6a. The dead areas are very small as compared with conventional areas of 5 mm width.

Figure 5:
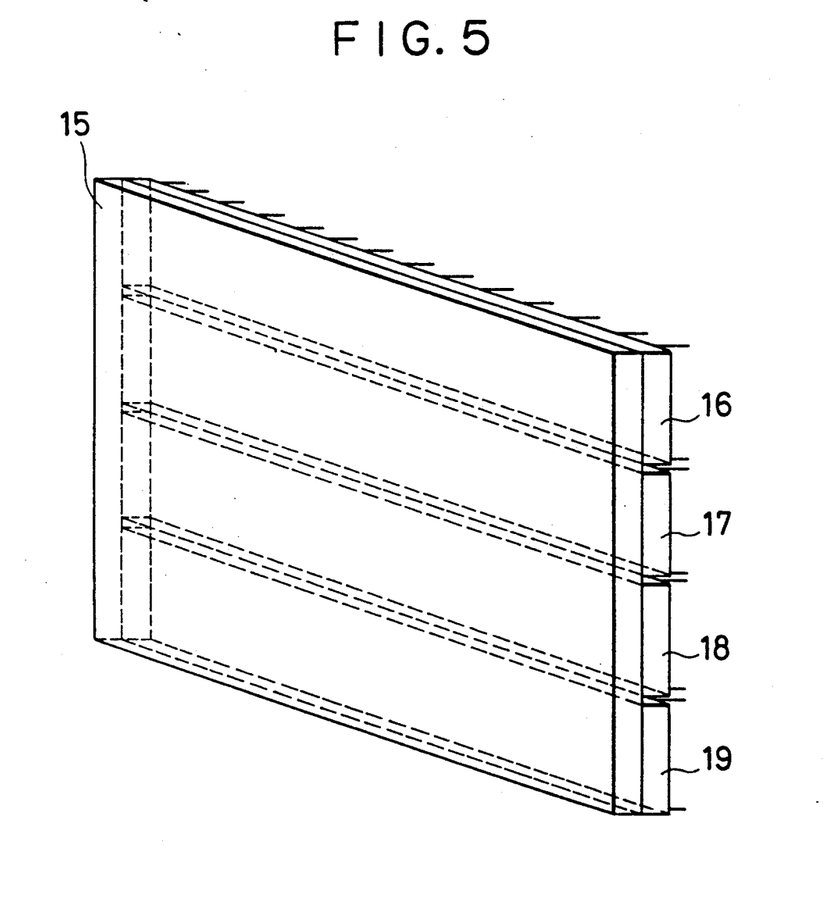
FIG. 5 is a perspective view showing an electro-optic device having a wide display frame in accordance with a second embodiment of the present invention.

Referring now to FIG. 5, an electro-optic device (display) having a wide display frame in accordance with a second embodiment of the present invention will be explained.

The display comprises a 1 m×1 m common glass substrate 15 and four opposed glass substrates 16 to 19 of 25 cm×1 m. Each substrate is formed with a set of parallel electrodes of 2.9 mm width with spacings of 0.1 mm therebetween on the inside thereof in the same manner as those of the first embodiment so that redundant description will not be repeated. The electrodes are formed by sputtering with a metal mask. The other configuration is same as that of the first embodiment. In accordance with this embodiment, the displaying frame is divided into four areas in the vertical direction and thereby the duty number is decreased by a factor of 4 so that high contrast can be maintained. Furthermore, the resistance of the vertical electrodes is decreased by a factor of 4 so that the voltage level necessary for supplying data signal can be decreased. Of course, the displaying frame may be divided into a more number of area by the use of more than 4 opposed substrates.

Figure 6A:
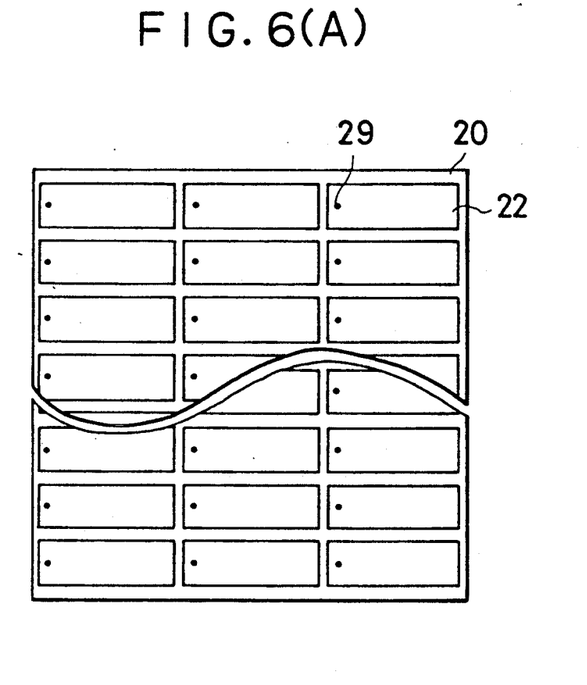
FIGS. 6(A) and 6(B) are partial plan views showing an electro-optic device having a wide display frame in accordance with a third embodiment of the present invention.
Figure 6B:
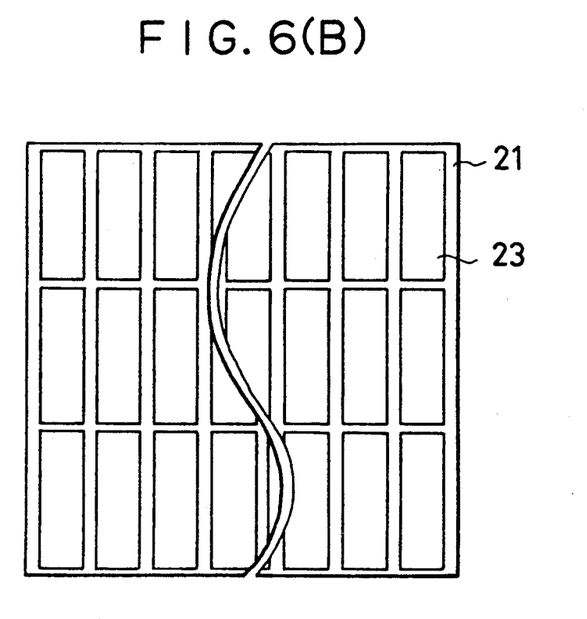

Referring now to FIGS. 6(A) and 6(B), an electro-optic device (display) having a wide display frame in accordance with a third embodiment of the present invention will be explained.

In this embodiment, a pair of glass substrates 20 and 21 of 3 m×3 m are used. Vertical and horizontal ITO electrodes 22 and 23 are formed on the respective substrates. Each electrode, however, is divided into three portions with respect to the direction of the length as shown in the figures. Each portion of the respective horizontal electrodes also makes electrical contact with a driving circuit by means of a Cr lead passing through a hole 29 in the same manner as the first embodiment. Each portion of the respective vertical electrodes makes electrical contact with a driving circuit through a hole (not shown) formed in the substrate 20 in the same manner as the first embodiment. In accordance with this embodiment, the displaying frame is divided into three areas in the vertical direction and thereby the duty number is decreased by a factor of 3 so that high contrast can be maintained. On the other hand, the displaying frame is nominally divided into three areas in the horizontal direction and thereby the resistance of the horizontal electrodes is also decreased by a factor of 3 so that the voltage necessary for supplying addressing signal can be decreased. The device (display) of the third embodiment corresponds to a multi-cell device (display) consisting of 9 liquid crystal cells of 30 cm×30 cm, which may be constructed in accordance with the first embodiment of the present invention. However, since there is no sealing member in the frame, undesirable effects such as black line shall completely not appear in the images displayed in this case. Of course, the electrodes can be divided into a more number of portions.

The foregoing description of preferred embodiments has been presented for purposes of illustration and description. It is not intended to be exhaustive or to limit the invention to the precise form described, and obviously many modifications and variations are possible in light of the above teaching. The embodiment was chosen in order to explain most clearly the principles of the invention and its practical application thereby to enable others in the art to utilize most effectively the invention in various embodiments and with various modifications as are suited to the particular use contemplated. For example, the leads passing through the substrate may be formed of stainless steel, Fe, Ag, Au, Ta, W, Ni, Cr, Mo, Al, C and so forth instead of Cu.

What is claimed is:

1. An electro-optic device comprising:
   a transparent substrate;
   an opposed substrate;
   an electrode arrangement formed on the inside surface of both of said transparent and opposed substrates in order to define a plurality of picture elements;

a light influencing layer disposed between said transparent and opposed substrates;

a sealing member provided at the periphery of said substrates for sealing said light influencing layer;

a plurality of leads making electrical contact with said electrode arrangement, wherein the contacts of each of said leads with said electrode arrangement are made through a plurality of through holes formed in a peripheral portion of said opposed substrate and said sealing member overlays said through holes.

2. The electro-optic device as claimed in claim 1 wherein said light influencing layer is a liquid crystal layer.

3. The electro-optic device as claimed in claim 1 wherein said electrode arrangement is made of a transparent conductive material.

4. The electro-optic device as claimed in claim 1 wherein said electrode arrangement is made of indium tin oxide.

5. A multi-cell electro-optic device comprising a plurality of constituent individual cells, each cell comprising:
a transparent substrate;
an opposed substrate;
an electrode arrangement formed on the inside surface of both of said transparent and opposed substrates in order to define a plurality of picture elements;
a light influencing layer disposed between said transparent and opposed substrates; and
a plurality of leads making electrical contact with said electrode arrangement,
wherein the contacts of said leads with said electrode arrangement are made through a plurality of through-holes formed in said opposed substrate.

6. The multi-cell electro-optic device as claimed in claim 5 wherein said light influencing layer is a liquid crystal layer.

7. The multi-cell electro-optic device as claimed in claim 6 further comprising a sealing member provided at the periphery of said substrates for avoiding loss of the liquid crystal material of said layer.

8. The multi-cell electro-optic device as claimed in claim 7 wherein said contacts are located at the periphery of said substrates.

9. The multi-cell electro-optic device as claimed in claim 5 wherein said electrode arrangement is made of a transparent conductive material.

10. The multi-cell electro-optic device as claimed in claim 5 wherein said electrode arrangement is made of indium tin oxide.

11. An electro-optic device comprising;
a transparent substrate;
a plurality of opposed substrates joined with said transparent substrate and arranged in order that substantially the entirety of the inside surface of said transparent substrate is covered by combination of said opposed substrates;
an electrode arrangement formed on the inside surface of both of said transparent substrate and each opposed substrate in order to define a plurality of picture elements;
a light influencing layer disposed between said transparent substrate and each opposed substrate; and
a plurality of leads making electrical contact with said electrode arrangement, wherein the contacts of each of said leads with said electrode arrangement are made through a plurality of through-holes formed in said opposed substrates.

12. The electro-optic device as claimed in claim 11 wherein said electrode arrangement comprising a plurality of first transparent electrodes extending in parallel formed on the inside surface of said transparent substrate and a plurality of second electrodes extending in the direction perpendicular to said first electrodes and formed on the inside surfaces of said opposed substrates in order to define a plurality of picture elements in association with said first electrode.

13. The electro-optic device as claimed in claim 11 wherein said light influencing layer is a liquid crystal layer.

14. The electro-optic device as claimed in claim 13 further comprising a sealing member provided at the periphery of each opposed substrate for avoiding loss of the liquid crystal material of said layer.

15. The electro-optic device as claimed in claim 14 wherein said contacts are located at the periphery of said substrates.

16. The electro-optic device as claimed in claim 11 wherein said electrode arrangement is made of a transparent conductive material.

17. The electrode-optic device as claimed in claim 11 wherein said electrode arrangement is made of indium tin oxide.

18. An electro-optic device comprising:
a transparent substrate;
an opposed substrate;
a plurality of first transparent electrodes extending in parallel formed on the inside surface of said transparent substrate;
a plurality of second electrode extending in the direction perpendicular to said first electrodes and formed on the inside surface of said opposed substrate in order to define a plurality of picture elements in association with said first electrodes;
a light influencing layer disposed between each of said transparent and opposed substrates; and
a plurality of leads making electrical contact with said first and second electrodes, the contacts of each of said leads with said electrodes being made through a plurality of through-holes formed in said opposed substrate;
wherein each of said first and/or second electrodes are divided into a plurality of individual portions arranged in the extending direction of that electrode.

19. The electro-optic device as claimed in claim 18 wherein said light influencing layer is a liquid crystal layer.

20. The electro-optic device as claimed in claim 19 further comprising a sealing member provided at the periphery of said substrates for avoiding loss of the liquid crystal material of said layer.

21. The electro-optic device as claimed in claim 20 wherein said contacts are located at the periphery of said substrates.

22. The electro-optic device as claimed in claim 18 wherein the electrodes are made of a transparent conductive material.

23. The electro-optic device as claimed in claim 22 wherein the electrodes are made of indium tin oxide.

* * * * *